United States Patent

[11] 3,628,167

[72] Inventor Marion E. Hines
Weston, Mass.
[21] Appl. No. 835,144
[22] Filed June 20, 1969
[45] Patented Dec. 14, 1971
[73] Assignee Microwave Associates, Inc.
Burlington, Mass.

[54] TRAVELLING WAVE MULTIPLE ELEMENT AMPLIFIER
6 Claims, 3 Drawing Figs.

[52] U.S. Cl. .......... 330/53, 330/61 A, 315/3.5
[51] Int. Cl. .......... H03f 3/60
[50] Field of Search .......... 330/61 A, 43; 315/3.5

[56] References Cited
UNITED STATES PATENTS

| | | | |
|---|---|---|---|
| 3,320,550 | 5/1967 | Gerlach | 330/61 X |
| 3,457,528 | 7/1969 | Ingersol | 333/80 |
| 3,411,101 | 11/1968 | Plutchok | 330/61 X |
| 3,445,778 | 5/1969 | Gerlach | 330/43 |

*Primary Examiner*—Nathan Kaufman
*Attorneys*—Nicholas Prasinos and Rosen & Steinhilper

ABSTRACT: Described are transmission line media and microwave structures for combining a multiplicity of elementary discharge devices (e.g., semiconductor diodes) biased for negative resistance at frequencies in a given band to obtain increased high-frequency power and high-frequency bandwidth of useful operation in that band, of microwave energy propagated in the transmission line media.

The basic principle involved is to prevent or suppress oscillations in undesired modes of resonance or propagation induced by the use of one or more diodes, by segregating these undesired modes into frequency bands outside the frequency range to be utilized.

Under this principle complex networks containing a large number of resonant loops and having as many resonant or normal modes as there are resonant loops are coupled into a primary transmission line so that the network may oscillate or amplify in the desired mode and each diode contributes an equal share of the total power of the network, but the negative conductance properties of the diodes are substantially ineffective at frequencies other than the desired modes.

MARION E. HINES, INVENTOR
BY
ATTORNEYS

TRAVELLING WAVE MULTIPLE ELEMENT AMPLIFIER

RELATED APPLICATIONS

This application is related to application Ser. No. 704,817 filed Feb. 12, 1968, now U.S. Pat. No. 3,491,318 by Marion E. Hines, the inventor in the present application, and assigned to the same assignee as the present application.

BACKGROUND OF THE INVENTION

The field of this invention is microwave generation and amplification of high power utilizing in combination a multiplicity of elementary devices which may be treated as two-terminal impedance elements which exhibit negative-resistance properties and are capable of individually generating high-frequency oscillations over particular ranges of frequencies when suitably biased by a battery or other source of power, and in particular it pertains to transmission line media and microwave structures for combining a multiplicity of elementary discharge elements biased for negative resistance to obtain increased high-frequency power and high-frequency bandwidth of microwave energy propagated in said transmission line media.

One suitable element is the Read avalanche diode or other PN-junction diode biased into reverse avalanche discharge. This is a semiconductor PN-junction device first described by Read.[1](1. W. T. Read, "A Proposed High-Frequency Negative-Resistance Diode," *Bell Systems Tech. Journal*, pp. 401–466, Mar., 1963.) Alternative forms have been described by DeLoach et al.[2](2. R. L. Johnston, B. C. DeLoach, Jr., B. G. Cohen, "A Silicon Diode Microwave Oscillator," *Bell Systems Tech. Journal*, pp. 316–372, Feb., 1965.) Another suitable semiconductor device is the Gunn diode[3](3. J. B. Gunn, "Microwave Oscillations of Current in III–V Semiconductors," *Solid State Comm.* Vol. 1, pp. 87–91, Sept., 1963.) which consists of a wafer of gallium arsenide biased with a DC source. Gallium arsenide devices operating in the "LSA" mode are also suitable, as described by Copeland.[4](4. V. A. Copeland, "L.S.A. Oscillator Diode Theory," *Journal of Applied Physics*, pp. 3,096–3,101, July, 1967.) structures may also be used if these can be arranged in an elementary form which provides a negative resistance at high frequency at two terminals. Still other forms might include PNPN-type semiconductor diodes, high vacuum electron tubes, tunnel diodes, and the like. This invention is not primarily concerned with the internal structure of these elementary devices but rather with the circuits and structures in which they are placed. The invention applies to the application of any type of such oscillating or negative-resistance electron discharge device, including those not mentioned above or new types which are yet to be discovered.

Previous techniques for combining multiple individual elements include several basic approaches. There is for example the technique of placing several small elements close together in a shunt or parallel combination across a high-voltage gap in a single resonator or cavity. Parallel operation in this way is limited to relatively few elements in a given resonator because they must be very closely spaced and the impedance level decreased in inverse proportion to the number used. Very low impedances cause high resistive losses in the resonator and present severe problems in coupling. A corollary approach has been to place several elements in a series stack in a single resonator. The series combination, however, presents serious problems in extracting the heat generated by the elements in the center of the stack. Heat must flow outward through the others, severely limiting the total power dissipation.

Another prior technique involves the use of many single microwave resonators with separated input and/or output transmission lines. Fukui[5](5. H. Fukui, "A Multiple Silicon—Avalanche Diode Oscillator," International Electron Devices Meeting, Oct. 26–28, 1966, *Digest of Papers*, p. 52.) has described such a technique for combining multiple separate oscillator circuits through the use of hybrid transmission line power combiners. When many elements are to be combined, the complexity and cost of such techniques becomes prohibitive.

Techniques for combining negative resistance diodes were described by Hines in U.S. Pat. Nos. 3,051,908 and 3,231,831. The first of these, while providing for broadband amplification, is limited in output power capability because the technique used to couple the transmission line and the diode elements requires that each element be activated by the full line voltage. The present invention, on the other hand, provides a substantial improvement over the prior approaches in that very large numbers of electron-discharge elements can be used in a single structure to provide high-power operation equivalent to the sum of the power available from each element.

A basic problem in combining many active negative-resistance elements for high-power oscillation or amplification in a given frequency band is that of "molding, " in which spurious or undesired modes of oscillation will occur at frequencies either within or outside of the desired band. At high frequencies, complex networks containing many electrical impedance elements generally have many "normal modes " of possible transient oscillation. When negative-resistance elements are included in such a network, continuous or erratic oscillations can occur in such modes if their resonant frequencies lie in a frequency range where the negative-resistance of the elements is effective. Such oscillations are called "spurious modes " when they involve undesired frequencies or internal electrical field patterns differing from the ones desired. The presence of spurious modes of oscillation will diminish the usefulness of a circuit or system for most applications.

It is a feature of this invention that spurious modes may be eliminated by appropriate network design criteria to be described.

In the accompanying drawings, FIG. 1 shows a qualitatively sketched graph illustrating the behavior of the conductance of some types of negative-resistance semiconductor device elements. This graph shows the type of variation with frequency to be expected. All of the devices are presumed to show negative conductance (or resistance) in a band including the frequency $f_0$ desired. All of the devices also show this negative conductance to be decreasing in magnitude and becoming positive at high-frequencies (e.g., $f_a$) far above the desired band. Some devices also show reduced or vanishing negative conductance effects at lower frequencies, well separated from the band in which the device is intended to be used.

In order to avoid spurious oscillations, the new networks described herein are designed so that all of the normal resonant modes except the one desired occur at higher or lower bands of frequency than the desired operating frequency band. Thus, if the spurious modes have frequencies in the general vicinity of $f_a$ or higher, no oscillations can occur in such modes because the active elements have only positive or very small negative conductance at such frequencies. It is thus also possible to avoid oscillation at frequencies where there is a small residual negative conductance near the crossover such as $f'_a$ on FIG. 1, because circuit losses can be sufficient to prevent oscillation in such marginal cases.

It has also been found that the presence of strong oscillations at one frequency can cause the suppression of undesired modes of oscillation which might occur at other frequencies in other modes, even if the devices exhibit strong negative resistance effects at these other frequencies when not oscillating strongly. All negative resistance devices are nonlinear such that when strongly oscillating at one frequency, the alternating voltage periodically drives the device into positive-resistance portions of its current-voltage characteristic curve. In fact, when a negative resistance device is driven by a strong alternating voltage of such a magnitude as to extract the maximum useful power at the driving frequency, it is found that the time-average value of its negative conductance has vanished. With slightly higher alternating voltage applied the time-average conductance is positive. Under such conditions, oscillations at other frequencies may see no effective negative resistance and cannot start.

Thus, it is not always necessary to remove the other resonant modes into frequency bands where no negative resistance is found. Substantial frequency separation between the desired and undesired modes is necessary, however, for this method of suppression to be effective. Mode suppression by strong signals is a most effective technique for high-power amplifiers where an input signal ensures that oscillation occurs at the proper frequency in the proper mode.

SUMMARY OF THE INVENTION

This invention relates in general to microwave generators and amplifiers of power and in particular to circuits and mounting structures for employing a plurality of electron discharge elements to generate or amplify microwave energy. A fundamental object of this invention is to provide useful circuits and mounting structures for multiple elements of the electron discharge type so that they will act in unison to provide a single high-frequency signal either coherently in a combined oscillation, or in synchronism under *rf* drive to provide a faithfully amplified replica of an input signal, and with a power output capability equivalent to the sum of the output capabilities of the many electron discharge elements used.

Another object of the invention is to provide a mounting structure for a plurality of electron discharge elements which can conduct away the excess heat energy produced by a multiplicity of elementary devices.

Still another object is to provide transmission line media for combining a multiplicity of elementary discharge devices biased for negative resistance at frequencies in a given band to obtain increased high-frequency power and high-frequency bandwidth of useful operation in that band of microwave energy propagated in the transmission line media.

DESCRIPTION OF THE INVENTION

Exemplary embodiments of the invention, and methods to make them, are described with reference to the accompanying drawings, in which.

Figure 2:
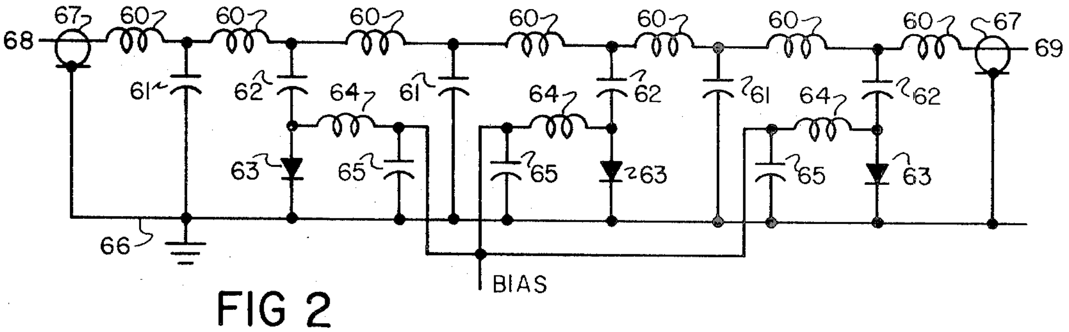
FIG. 2 illustrates an equivalent circuit of one class of network in accordance with this invention.
Figure 3:
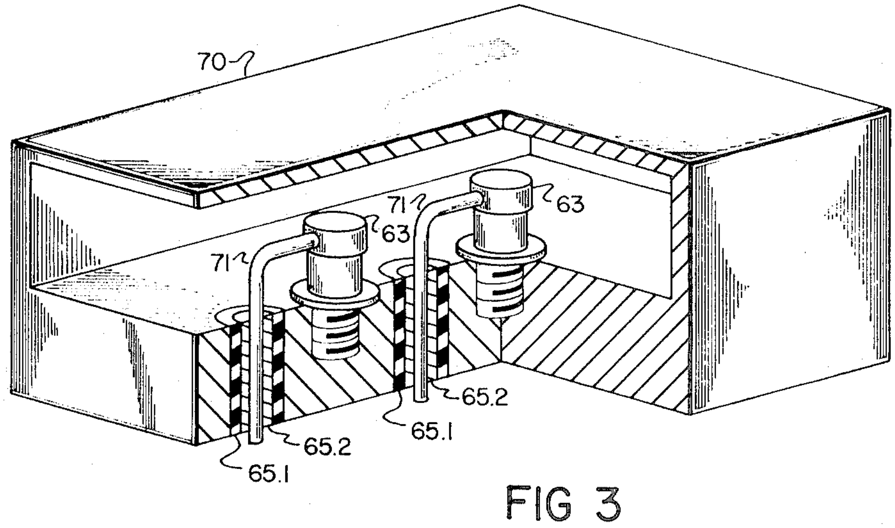
Figure 1:
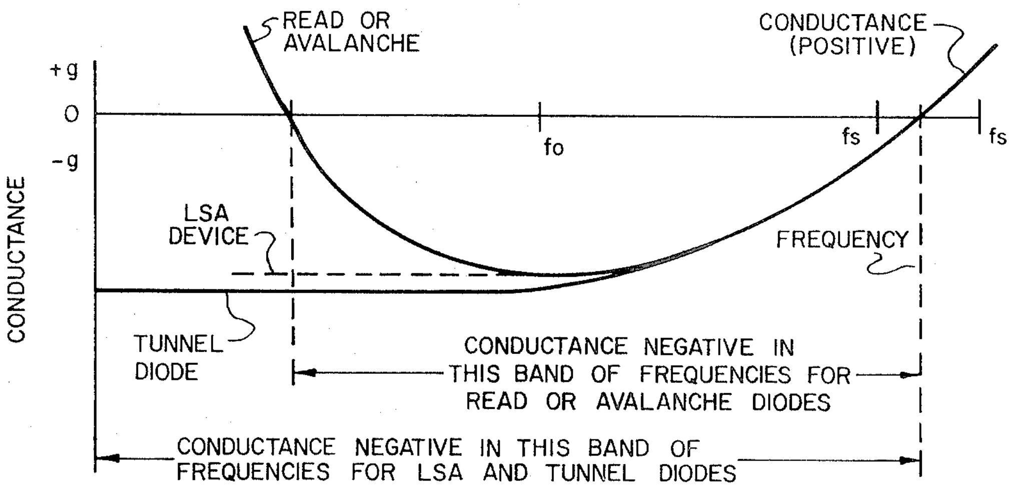
FIG. 1 shows the above-referenced graph of conductance variation vs. frequency.

FIG. 3 pictorially and schematically illustrates one embodiment of FIG. 2 wherein the transmission line medium is a waveguide.

Referring to FIG. 2, we show a representation of a transmission line in which series inductive elements 60, and shunt capacitance elements 61 are shown as discrete elements distributed along the length. As is common in describing coaxial or other transmission lines, these elements are normally smoothly distributed but are shown in lumped-element form here for convenience in pictorial representation. This line is shown to have a continuous conductive path from the input at 68 to the output at 69. The grounded circles 67 are a symbolic representation of a coaxial line. Other transmission line media, such as rectangular waveguide microstrip or stripline, may also be used in practice. Distributed along the transmission path 68 to 69 are small capacitive elements 62 which couple a multiplicity of electron discharge elements (diodes) 63 to the line. These diodes are biased in parallel through the inductive elements 64, with bypass capacitors 65 to ground. The inductive elements 64 are chosen so that the resonant frequency of the diode capacitance of element 63, in series with the inductance 64 resonates at a frequency well outside of the band of interest, either above or below as previously described. This principle of mode separation is a major feature of the invention. This network accomplishes the desired aim of combining many negative-resistance elements into a single network with a single output, combining the power capabilities of all of the elements. The network also avoids the hazards of oscillation in undesired resonant modes of the network. This has been accomplished through a novel network in which all modes but the one desired are in a band of frequencies where the active elements are substantially ineffective as negative-resistance or power generators. In this embodiment of the invention, the negative resistance of each diode element is lightly coupled to the transmission line, and each may contribute to the energy on the line, causing wave amplification with distance. As in the other embodiments of the invention, i.e., in combination with microstrip transmission lines, the local resonant modes of the structure are outside of the frequency band of interest and will not be subject to oscillation, provided these frequencies are properly chosen according to the principle we have established.

Referring to FIG. 3, we show a waveguide embodiment of the invention shown schematically in FIG. 2. The waveguide has distributed inductance and capacitance, according to well-known theories of this device. The diodes 63 are shown mounted on one inner face of the waveguide, with an elongated cap which provides a capacitive coupling element to the opposite face of the waveguide, corresponding to the elements 62 of FIG. 2. Again, in FIG. 3, bypass capacitors 65 are cylindrical in form, having an insulating layer 65.1 between the waveguide 70 and inner conductor 65.2 feeding the bias voltage into the waveguide chamber. A small wire or strap 71 connects each diode cap to the bypass conductor. The self-inductance of these wires or straps corresponds to the inductive elements 64 of FIG. 2. According to our invention, each diode is coupled to the wave energy of travelling RF power in the waveguide through the capacitance of the caps on each diode.

The embodiments of the invention which have been illustrated and described herein are but a few illustrations of the invention. Other alternative circuit arrangements may be made within the scope of this invention by those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention.

I claim:

1. A high-frequency electrical travelling wave amplifier, combining a multiplicity of elementary electron discharge devices biased for negative resistance at frequencies in a given operating frequency band comprising:

a. electromagnetic wave transmission line means having an input and an output for wave energy in said frequency band;

b. a multiplicity of electron discharge elements which when suitably biased exhibit negative resistance in said frequency band;

c. biasing means and mounting means for each of said elements distributed along the length of said electromagnetic wave transmission line means, said biasing means and mounting means each having inductance of magnitude such that the range of natural resonant frequencies of each of said elements in said biasing and mounting means is substantially different from said given operating frequency band;

d. and coupling means coupling each of said electron discharge elements to said electromagnetic wave transmission line means such that when wave energy in said operating frequency band is incident on said input, and when said elements are suitably biased as aforesaid, each of said elements may contribute to the energy propagating in said transmission line means.

2. A high-frequency electrical travelling wave amplifier as recited in claim 1 wherein the coupling means coupling said electron discharge elements to said electromagnetic wave transmission line means are capacitative.

3. A high-frequency electrical travelling wave amplifier as recited in claim 1 wherein the electromagnetic wave transmission line means comprise a coaxial transmission line.

4. A high-frequency electrical travelling wave amplifier as recited in claim 1 wherein the electromagnetic wave transmission line means comprise a waveguide.

5. A high-frequency electrical travelling wave amplifier as recited in claim 2 wherein the multiplicity of discharge elements comprise negative-resistance devices.

6. A high-frequency electrical travelling wave amplifier as recited in claim 2 wherein the multiplicity of discharge elements comprise semiconductor diodes.

* * * * *